(12) United States Patent
Izumi et al.

(10) Patent No.: US 11,428,138 B2
(45) Date of Patent: Aug. 30, 2022

(54) POROUS MATERIAL, HONEYCOMB STRUCTURE, AND METHOD OF PRODUCING POROUS MATERIAL

(71) Applicant: NGK Insulators, Ltd., Nagoya (JP)

(72) Inventors: Yunie Izumi, Nagoya (JP); Takahiro Tomita, Nagoya (JP); Mika Tsuboi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 591 days.

(21) Appl. No.: 15/782,093

(22) Filed: Oct. 12, 2017

(65) Prior Publication Data
US 2018/0112577 A1 Apr. 26, 2018

(30) Foreign Application Priority Data

Oct. 24, 2016 (JP) .............................. JP2016-208153
Jun. 2, 2017 (JP) .............................. JP2017-110016
Sep. 7, 2017 (JP) .............................. JP2017-172072

(51) Int. Cl.
*F01N 3/28* (2006.01)
*F01N 3/022* (2006.01)
(Continued)

(52) U.S. Cl.
CPC ....... *F01N 3/2828* (2013.01); *B01D 53/9418* (2013.01); *B01J 35/1033* (2013.01); *B01J 37/0246* (2013.01); *C04B 35/565* (2013.01); *C04B 35/584* (2013.01); *C04B 38/0006* (2013.01); *C04B 38/0074* (2013.01); *F01N 3/0222* (2013.01); *B01D 2251/2062* (2013.01); *B01D 2255/2027* (2013.01); *B01D 2255/2061* (2013.01); *B01D 2255/2065* (2013.01); *B01D 2255/2092* (2013.01); *B01D 2255/20707* (2013.01); *B01D 2255/20738* (2013.01);
(Continued)

(58) Field of Classification Search
CPC .......................... C04B 38/0006; F01N 3/2828
See application file for complete search history.

(56) References Cited

U.S. PATENT DOCUMENTS

| | | |
|---|---|---|
| 5,780,374 A | 7/1998 | Kawai et al. |
| 2003/0148063 A1 | 8/2003 | Morimoto et al. |

(Continued)

FOREIGN PATENT DOCUMENTS

| | | |
|---|---|---|
| CN | 1168362 A | 12/1997 |
| CN | 1277173 A | 12/2000 |

(Continued)

OTHER PUBLICATIONS

Ding, S.; Zhu, S.; Zeng, Y.; Jiang, D.; "Fabrication of Mullite-Bonded Porous Silicon Carbide Ceramics by In Situ Reaction Bonding", Journal of European Ceramic Society, 2007, p. 2095-2102.*

(Continued)

*Primary Examiner* — Mark Ruthkosky
*Assistant Examiner* — Julia L Rummel
(74) *Attorney, Agent, or Firm* — Burr & Brown, PLLC

(57) ABSTRACT

A porous material includes an aggregate in which oxide films are formed on surfaces of particle bodies, and a binding material that contains cordierite and binds the aggregate together in a state where pores are formed. The binding material or the oxide films contain a rare-earth component that excludes Ce.

7 Claims, 5 Drawing Sheets

(51) Int. Cl.
    *C04B 38/00*     (2006.01)
    *C04B 35/584*     (2006.01)
    *C04B 35/565*     (2006.01)
    *B01D 53/94*     (2006.01)
    *B01J 35/10*     (2006.01)
    *B01J 37/02*     (2006.01)
    *C04B 111/00*     (2006.01)

(52) U.S. Cl.
CPC .. *B01D 2255/30* (2013.01); *B01D 2255/9205* (2013.01); *C04B 2111/0081* (2013.01); *C04B 2111/00793* (2013.01); *C04B 2235/3201* (2013.01); *C04B 2235/3213* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3263* (2013.01); *C04B 2235/3272* (2013.01); *C04B 2235/3418* (2013.01); *C04B 2235/3445* (2013.01); *C04B 2235/3481* (2013.01); *C04B 2235/80* (2013.01); *C04B 2235/9607* (2013.01); *Y02T 10/12* (2013.01)

(56) References Cited

U.S. PATENT DOCUMENTS

| | | | |
|---|---|---|---|
| 2005/0143255 A1 | 6/2005 | Morimoto et al. | |
| 2006/0003889 A1 | 1/2006 | Furukawa et al. | |
| 2007/0026190 A1 | 2/2007 | Baba | |
| 2007/0028604 A1* | 2/2007 | Twigg | F01N 3/0222 60/297 |
| 2007/0261378 A1* | 11/2007 | Miao | C04B 38/0006 55/523 |
| 2013/0111862 A1* | 5/2013 | Divens-Dutcher | B01D 39/2068 55/523 |
| 2013/0255213 A1 | 10/2013 | Izumi et al. | |
| 2014/0357476 A1 | 12/2014 | Bischof et al. | |
| 2014/0370232 A1 | 12/2014 | Izumi et al. | |
| 2014/0370233 A1* | 12/2014 | Izumi | C04B 35/6316 428/116 |
| 2015/0093540 A1 | 4/2015 | Ichikawa et al. | |
| 2015/0258485 A1* | 9/2015 | Kikuchi | B01D 46/244 422/177 |
| 2015/0259254 A1* | 9/2015 | Ichikawa | C04B 35/565 428/116 |

FOREIGN PATENT DOCUMENTS

| | | |
|---|---|---|
| CN | 1316400 A | 10/2001 |
| CN | 1767884 A | 5/2006 |
| CN | 104513064 A | 4/2015 |
| EP | 1 214 973 B1 | 6/2011 |
| JP | 4111439 B2 | 7/2008 |
| JP | 4227347 B2 | 2/2009 |
| JP | 4404538 B2 | 1/2010 |
| JP | 2014-194172 A | 10/2014 |
| JP | 5922629 B2 | 5/2016 |
| JP | 5926593 B2 | 5/2016 |
| JP | 2016-523800 A | 8/2016 |
| JP | 6043340 B2 | 12/2016 |

OTHER PUBLICATIONS

English language translation of CN 1277173 A, generated on Aug. 6, 2021 with Espacenet website (https://www.epo.org/searching-for-patents/technical/espacenet.html). Paragraph numbers added by Examiner.*
U.S. Appl. No. 15/782,049, filed Oct. 12, 2017, Tsuboi, Mika.
U.S. Appl. No. 15/782,064, filed Oct. 12, 2017, Izumi, Yunie.
U.S. Appl. No. 15/785,838, filed Oct. 17, 2017, Izumi, Yunie.
Chinese Office Action, Chinese Application No. 201710982466.X, dated Mar. 3, 2021 (7 pages).
Chinese Office Action, Chinese Application No. 201710982467.4, dated May 20, 2021 (11 pages).

* cited by examiner

POROUS MATERIAL, HONEYCOMB STRUCTURE, AND METHOD OF PRODUCING POROUS MATERIAL

TECHNICAL FIELD

The present invention relates to a porous material, a honeycomb structure, and a method of producing a porous material.

BACKGROUND ART

Porous materials with a plurality of pores, in which an aggregate such as silicon carbide particles (SiC particles) is bound together with a binding material as an oxide phase such as cordierite, have excellent properties such as high thermal shock resistance. These porous materials are used to form honeycomb structures that include a plurality of cells partitioned off and formed by partition walls, and these honeycomb structures are used as catalyst carriers or diesel particulate filters (DPFs) in various applications such as processing for purifying exhaust gases (see Japanese Patent Nos. 4111439 and 4227347, for example).

Japanese Patent No. 5926593 discloses a porous material that includes an aggregate and an amorphous binding material, the binding material containing 1.5 to 10.0 mass % of rare-earth oxides with respect to the mass of the whole binding material. Japanese Patent No. 5922629 discloses a porous material that includes an aggregate and a binding material containing crystalline cordierite, the binding material containing 1.5 to 10.0 mass % of cerium oxides. Japanese Patent No. 4404538 discloses a silicon carbide-based catalyst body for use in purification of exhaust gases, in which a porous body formed by bonding silicon carbide particles supports a catalyst via a crystalline coating film of cristobalite formed as a coating on surfaces of the silicon carbide particles. Japanese Patent Application Laid-Open (Translation of PCT Application) No. 2016-523800 describes that a formed ceramic substrate used as a support for catalysts desirably retain a low sodium content in order to maintain high catalytic activity.

In the case of supporting a selective catalytic reduction (SCR) catalyst such as zeolite, a honeycomb structure is heated to around 200° C. in the process of drying slurry that contains the catalyst. Thus, a porous material for forming the honeycomb structure is required to have high thermal shock resistance in order to adequately perform the SCR catalyst supporting process. The porous material is also required to have high oxidation resistance because the honeycomb structure is exposed to exhaust gases.

SUMMARY OF INVENTION

The present invention is intended for a porous material, and it is an object of the present invention to increase the oxidation resistance and thermal shock resistance of the porous material.

A porous material according to the present invention includes an aggregate in which oxide films are formed on surfaces of particle bodies, and a binding material that contains cordierite and binds the aggregate together in a state where pores are formed. The binding material or the oxide films contain a rare-earth component excluding Ce.

According to the present invention, the presence of the oxide films helps increase the oxidation resistance of the porous material. It is also possible to reduce the thermal expansion coefficient of the porous material while ensuring high mechanical strength, and thereby to increase the thermal shock resistance thereof.

In a preferred embodiment of the present invention, a ratio of a mass of the rare-earth component in terms of an oxide is in a range of 0.1 to 15.0 mass % of the porous material as a whole.

In another preferred embodiment of the present invention, the binding material contains the rare-earth component, and the rare-earth component includes at least one kind selected from the group consisting of Y, Yb, Er, and Ho.

In another preferred embodiment of the present invention, the binding material contains the rare-earth component, and at least part of the rare-earth component exists as $A_2Si_2O_7$ (A: Y, Yb, Er, or Ho).

In another preferred embodiment of the present invention, the oxide films contain the rare-earth component, and the rare-earth component includes at least one kind selected from the group consisting of Dy, La, Nd, and Gd.

In another preferred embodiment of the present invention, the particle bodies are SiC particles or $Si_3N_4$ particles.

In this case, the oxide films preferably contain cristobalite.

More preferably, a ratio of a mass of the cristobalite is in a range of 3.0 to 25.0 mass % of the porous material as a whole.

In another preferred embodiment of the present invention, an alkali metal component is contained in the porous material, and a ratio of a mass of the alkali metal component in terms of an oxide is less than 0.1 mass % of the porous material as a whole.

In this case, for example, the porous material contains Na or K as the alkali metal component.

In a preferable example of the porous material, a thermal expansion coefficient at 200° C. with reference to 40° C. is less than or equal to 5.5 ppm/K. It is preferable that a representative value for an angle at which an edge of the binding material in a cross-section of the porous material rises with respect to a direction tangent to the edge at a position at which curvature is locally a maximum is greater than 0 degrees and less than or equal to 25 degrees.

The present invention is also intended for a honeycomb structure. The honeycomb structure according to the present invention is a tubular member made of the porous material described above and having an interior partitioned into a plurality of cells by partition walls.

The present invention is also intended for a method of producing a porous material. The method of producing a porous material according to the present invention includes a) obtaining a compact by molding a mixture of an aggregate raw material, a raw material of binding material, and a pore forming material, b) obtaining a fired compact by firing the compact at a temperature of 1300 to 1600° C. in an inert atmosphere, and c) obtaining a porous material by subjecting the fired compact to oxidation treatment at a temperature of 1150 to 1350° C. in an oxidizing atmosphere. The aggregate raw material is a non-oxide material, the raw material of binding material contains a rare-earth component excluding Ce, and the porous material contains cordierite as a binding material.

These and other objects, features, aspects and advantages of the present invention will become more apparent from the following detailed description of the present invention when taken in conjunction with the accompanying drawings.

DESCRIPTION OF EMBODIMENTS

Hereinafter, embodiments of a porous material, a honeycomb structure, and a method of producing a porous material will be described with reference to the drawings. The porous material, the honeycomb structure, and the method of producing a porous material according to the present invention are not intended to be limited to the embodiments described below, and various design changes, modifications, improvements are possible without departing from the gist of the present invention.

(1) Porous Material

Figure 1:
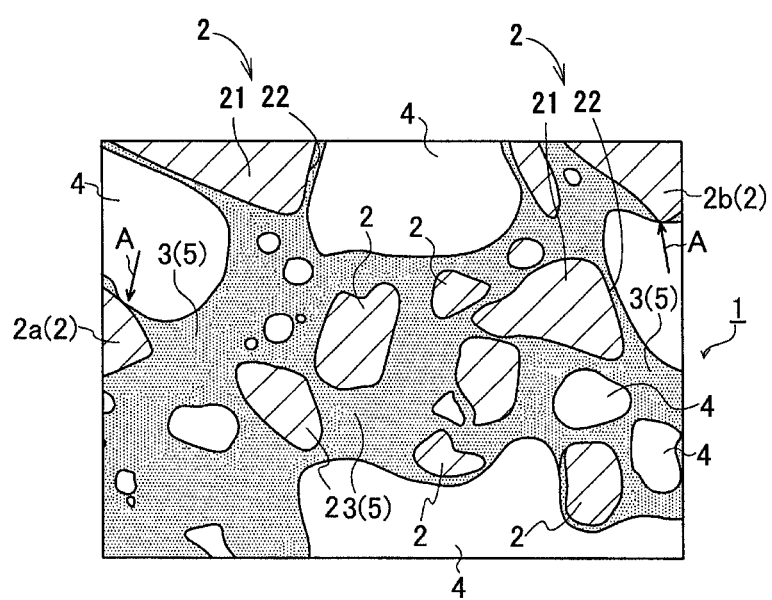
FIG. 1 illustrates a structure of a porous material.
Figure 2:
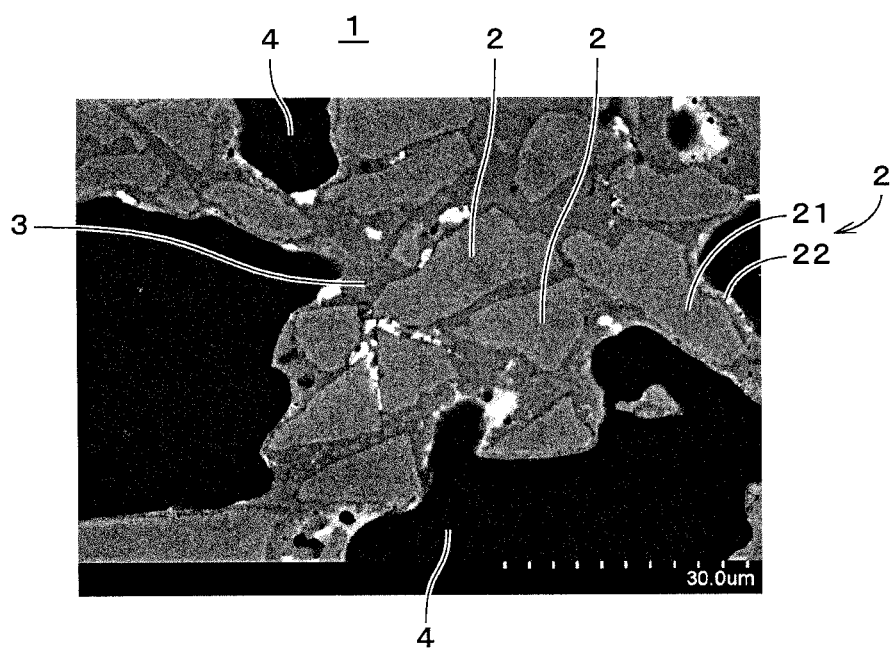
FIG. 2 illustrates a photograph showing one example of the porous material.

FIG. 1 schematically illustrates a structure of a porous material 1. FIG. 2 shows an example of the porous material 1 that is actually produced, illustrating a photograph taken with a scanning electron microscope. FIG. 2 illustrates a mirror-polished cross-section of the porous material 1.

The porous material 1 according to the present embodiment is a ceramics material composed primarily of an aggregate 2 and a binding material 3, the aggregate 2 having oxide films 22 formed on surfaces of particle bodies 21, and the binding material 3 binding the aggregate 2 together in a state where pores 4 are formed. As will be described later, the porous material 1 can have reduced thermal expansion coefficient while ensuring high mechanical strength, and thereby improved thermal shock resistance. Besides, the presence of the oxide films 22 helps increase oxidation resistance. The porous material 1 is used to produce honeycomb structures.

The ratio of the mass of the aggregate 2 to the total mass of the aggregate 2 and the binding material 3, i.e., the ratio of the mass of the aggregate 2 to the mass of the whole porous material 1, is greater than or equal to 50 mass %. In other words, the ratio of the mass of the binding material 3 is less than or equal to 50 mass % of the whole porous material 1. Preferably, the ratio of the mass of the binding material 3 is greater than or equal to 8 mass % of the whole porous material 1. This composition ensures a certain level of mechanical strength (typically, bending strength; hereinafter also simply referred to as "strength") of the porous material 1. In order to further increase the strength of the porous material 1, the ratio of the binding material 3 in the porous material 1 is preferably greater than or equal to 10.0 mass %, and more preferably greater than or equal to 15.0 mass %. If the ratio of the binding material 3 in the porous material 1 exceeds 40 mass %, the porous material 1 will have more difficulty in achieving high porosity. In order for the porous material 1 to easily achieve high porosity, the ratio of the binding material 3 in the porous material 1 is preferably less than or equal to 35.0 mass %, and more preferably less than or equal to 30.0 mass %. Note that substances other than the aggregate 2 in the porous material 1 are assumed to be, in principle, included in the binding material 3.

In a typical example of the porous material 1, surfaces at three-phase interfaces of the aggregate 2, the binding material 3, and the pores 4 are formed in a "smoothly bound" state as in a cross-sectional microstructure schematically illustrated in FIG. 1. Here, the "smoothly bound" surfaces at the three-phase interfaces refer to a state in which the binding material 3 that binds particles of the aggregate 2 together extends either smoothly or in a gentle curve (or along a curved surface) from the vicinity of a three-phase interface (e.g., three-phase interfaces A in FIG. 1; see the arrows) of one particle of the aggregate 2, the binding material 3, and a pore 4 in a direction toward another particle of the aggregate 2. While a single location of the three-phase interface A is indicated by way of example in FIG. 1, the three-phase interfaces are not limited to this example, and FIG. 1 also includes other three-phase interfaces of the aggregate 2, the binding material 3, and the pores 4.

In the porous material 1 according to the present embodiment, the "three-phase interfaces" are, strictly speaking, limited to areas where the aggregate 2a and 2b, the binding material 3, and the pores 4 intersect with one another as illustrated in FIG. 1, but in the specification, they are assumed to also include areas where the surfaces of the aggregate 2 are lightly covered with the binding material 3 and in close proximity to the pores 4.

In the case of the porous material 1 according to the present embodiment, assuming that the aggregate 2 is solid and at least part of the binding material 3 is in a liquid state during firing at high temperature, the liquid binding material 3 adheres with a small contact angle to the surfaces (solid-phase surfaces) of the solid aggregate 2, and this condition is maintained until the completion of firing and cooling so as to obtain the microstructure as illustrated in FIG. 1.

In this way, some (or most) portions of the aggregate 2 are covered with the binding material 3. As a result, angular edge portions of the aggregate 2 are covered with the binding material 3, and somewhat rounded shapes appear as a whole. The pores 4 in contact with the aggregate 2 and the binding material 3 also have rounded edge shapes. Such a structure that includes many curved portions at, in particular, the three-phase interfaces of the aggregate 2, the binding material 3, and the pores 4 is expressed as a "smoothly bound" state in the specification.

Figure 3:
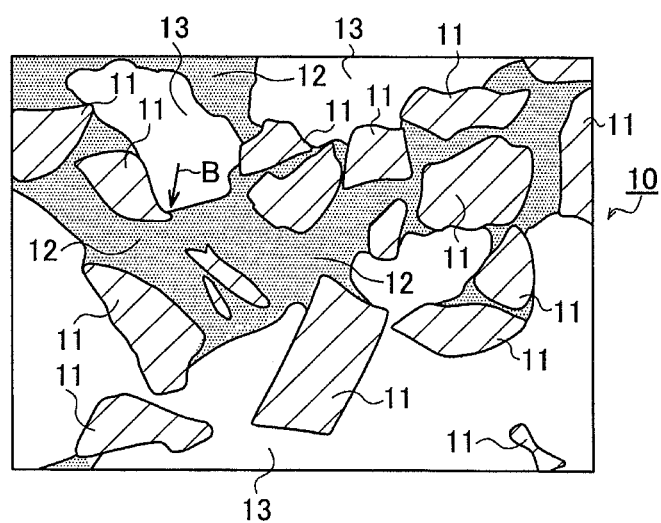
FIG. 3 illustrates a structure of a porous material according to a comparative example.
Figure 4:
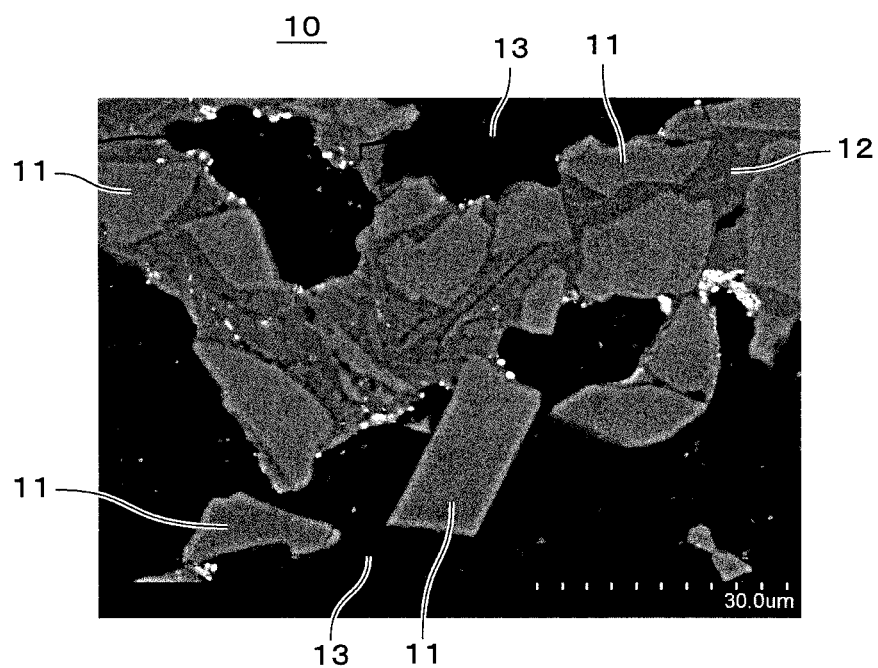
FIG. 4 illustrates a photograph of the porous material according to the comparative example.

FIG. 3 schematically illustrates a structure of a porous material 10 according to a comparative example. FIG. 4 illustrates the porous material 10 that is actually produced according to the comparative example, illustrating a photograph taken with a scanning electron microscope. The porous material 10 according to the comparative example differs from the porous material 1 in FIG. 1 in that its binding material 12 does not contain an yttrium component 5, which will be described later.

In the case of a cross-sectional microstructure of the porous material 10 according to the comparative example, an angular aggregate 11 with linear sharp edges is observed just as it is, and the binding material 12 that binds particles of the aggregate 11 together extends in a linear shape in the vicinity of a three-phase interface B (see the arrow in FIG. 3) of one particle of the aggregate 11, the binding material 12, and a pore 13 toward another particle of the aggregate 11. Thus, this is not in a "smoothly bound" state as defined above. Moreover, most (e.g., 50% or more) of the surfaces of the aggregate 11 are in contact with the pores 13, and this is different from the porous material 1 according to the present embodiment in which most (e.g., 50% or more) of the surfaces of the aggregate 2 are covered with the binding material 3, and the pores 4 are in contact with the binding material 3.

That is, in the case of the porous material 10 according to the comparative example, the binding material 12 does not have curved shapes in the vicinity of the interfaces with the aggregate 11; the aggregate 11 and the pores 13 also do not have rounded shapes; and many of them are configured angularly or linearly or in irregular shapes, as compared with the porous material 1 according to the present embodiment. The porous material 1 according to the present embodiment greatly differs in microstructure from the porous material 10 according to the comparative example.

The porous material 1 according to the present embodiment is expected to have smoothly bound three-phase interfaces of the aggregate 2, the binding material 3, and the pores 4 and to have a large area of contact between the aggregate 2 and the binding material 3. As a result, the bonding force between the aggregate 2 and the binding material 3 increases, and this increase in the bonding force at each interface between each of the aggregate 2 and the binding material 3 leads to an increase in the strength (mechanical strength) of the porous material 1 as a whole.

The porous material 1 having a "smoothly bound" microstructure as illustrated in FIG. 1 can relieve stress concentration applied to edge portions by its curved shape, as compared with the porous material 10 (see FIG. 3) having a microstructure with sharp edges. Accordingly, the strength of the porous material 1 as a whole increases.

Figure 5:
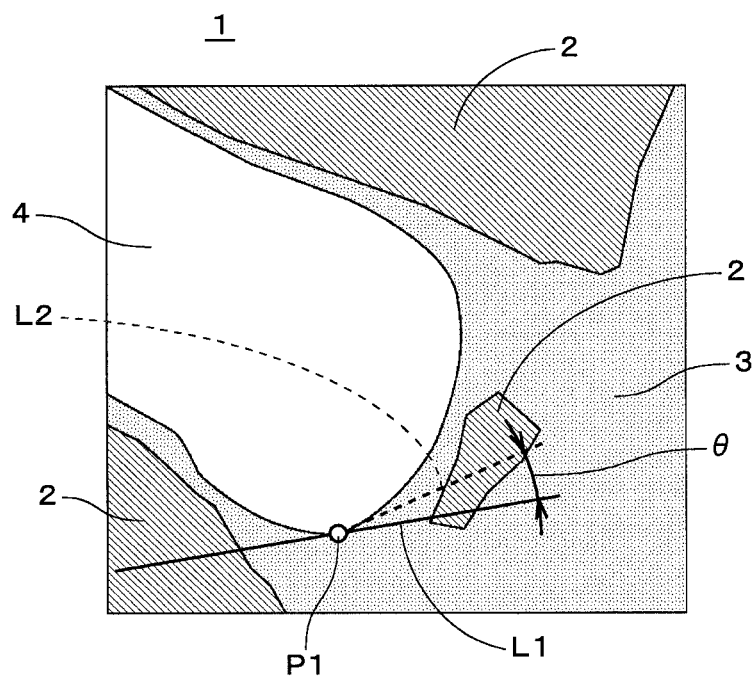
FIG. 5 is a diagram describing a measurement of the angle of rise.

The quantification of the above-described microstructure of the porous material 1 will now be described. In the porous material 1, boundary lines between the binding material 3 and the pores 4 (hereinafter, simply referred to as "edges of the binding material") have rounded shapes as viewed in an image of a mirror-polished cross-section. Thus, in one example of the quantification of the above-described microstructure, the rounding of the edges of the binding material 4 is converted into numbers. More specifically, first, a cross-section obtained by mirror-polishing the porous material 1 contained in a resin is photographed at a magnification of 1500 times with a scanning electron microscope so as to obtain an image that is a reflected electron image. The magnification of the image may be appropriately changed. FIG. 5 illustrates part of this image.

Then, a measurement position P1 on an edge of the binding material 3 is specified in the image. The measurement position P1 is a position at which the curvature is locally a maximum on the edge of the binding material 3. In the above-described microstructure of the porous material 1, the edge of the binding material 3 that binds two particles of the aggregate 2 together has a concave shape between the vicinity of the three-phase interface with one particle of the aggregate 2 and the vicinity of the three-phase interface with the other particle of the aggregate 2. Between these three-phase interfaces, typically, the inclination of the edge of the binding material 3 changes continuously and there are few angular portions. One example of the measurement position P1 is a position that has a maximum curvature between those three-phase interfaces on the edge of the binding material 3. In the porous material 10 according to the comparative example, the edges of the binding material 12 do not have rounded shapes, and therefore a top of a recessed portion on an edge of the binding material 12 is specified as a measurement position P1.

Then, a straight line that indicates a direction tangent to the edge of the binding material 3 at the measurement position P1 is set as a reference line L1 as illustrated in FIG. 5. In the vicinity of the measurement position P1, a straight line that rises from the measurement position Pl toward one side along the edge of the binding material 3 is set as a rising line L2. The rising line L2 is, for example, a straight line that connects the measurement position P1 on the edge of the binding material 3 and a position that is spaced toward one side by a predetermined infinitesimal distance (e.g., 1 to 5 μm) from the measurement position P1. Then, the angle formed by the reference line L1 and the rising line L2 is acquired as the angle of rise θ. In this way, the angle of rise θ indicates an angle at which an edge of the binding material 3 in a given cross-section of the porous material 1 rises from the measurement position P1 at which the curvature is locally a maximum, with respect to a direction tangent to this edge at the measurement position P1.

For example, a plurality of angles of rise θ are obtained by specifying a plurality of measurement positions P1, and an average value of these angles is obtained as a representative value for the angle of rise on the edge. In the porous material 1 with the above-described microstructure, the representative value for the angle of rise is typically greater than 0 degrees and less than or equal to 25 degrees. On the other hand, in the porous material 10 according to the comparative example, the representative value for the angle of rise is greater than 25 degrees because the edges of the binding material 12 do not have rounded shapes and tops of recessed portions on edges of the binding material 12 are specified as measurement positions P1. The representative value for the angle of rise may be a median value or other values, instead of the average value. The number of measurement positions P1 to be specified in obtaining the representative value for the angle of rise is preferably larger than or equal to 5 (e.g., smaller than or equal to 100).

In the porous material 1 according to the present embodiment, the above-described microstructure is obtained by including the yttrium (Y) component 5 in the binding material 3, which is used to bind the aggregate 2 together. In the porous material 1, a smoothly bound state of the surfaces at the three-phase interfaces of the aggregate 2, the binding material 3, and the pores 4 does not necessarily have to be clear. In other words, it can also be expected that the aforementioned smoothly bound state of the surfaces at the three-phase interfaces may be unclear, depending on factors such as the ratio of the mass of the binding material 3 to the mass of the porous material 1 and the particle diameter of the aggregate 2. Even in this case, the porous material 1 that includes the aforementioned Y component 5 in the binding material can have improved mechanical strength.

As an yttrium source of the Y component 5, various types of oxides (e.g., $Y_2O_3$) or various types of yttrium salts may be used, for example. Alternatively, a plurality of types of yttrium sources may be used. Typically, the smoothly bound state of the surfaces at the three-phase interfaces can be achieved by including a prescribed ratio of the Y component 5 in the binding material 3. As a result, the high-strength porous material 1 with a microstructure as described above can be obtained.

Preferably, the ratio of the mass of the Y component 5 contained in the binding material 3 in terms of yttrium oxide ($Y_2O_3$) is set in the range of 0.1 to 15.0 mass % (i.e., greater than or equal to 0.1 mass % and less than or equal to 15.0 mass %; the same applies hereinafter) of the whole porous material 1. If the ratio of the mass of the Y component 5 in terms of $Y_2O_3$ is less than 0.1 mass %, there are only poor effects of the Y component 5, and it is difficult to achieve the "smoothly bound" state at the three-phase interfaces between the aggregate 2 and the binding material 3.

On the other hand, if the ratio of the mass of the Y component 5 in terms of $Y_2O_3$ in the whole porous material 1 is greater than 15.0 mass %, it can be expected that the amount of the binding material 3 to be liquefied during firing will increase excessively. As described previously, the binding material 3 that is exposed to a high firing temperature during firing is assumed to be liquefied in part. Thus, if a large part of the binding material 3 is liquefied, part of the liquefied biding material 3 may cause foaming. Thereby, gas bubbles are more likely to occur due to the foaming in the binding material 3, and a plurality of cavities (not shown) may be generated in the binding material 3 as a result of the binding material being cooled and solidified. As a result, the bonding force between the aggregate 2 and the binding material 3 may decrease and accordingly the strength of the porous material 1 may decrease due to the cavities generated between the aggregate 2 and the binding material 3. Hence, the ratio of the mass of the Y component 5 contained in the binding material 3 is preferably set in the aforementioned numerical range. In order to further increase the strength of the porous material 1, the ratio of the mass of the Y component 5 is preferably greater than or equal to 0.5 mass %, and more preferably greater than or equal to 1.0 mass %. Similarly, the ratio of the mass of the Y component 5 is preferably less than or equal to 10.0 mass %, and more preferably less than or equal to 5.0 mass %. The ratio of the mass of the Y component 5 to the mass of binding material 3 is, for example, in the range of 1.0 to 20.0 mass %, and more preferably in the range of 3.0 to 12.0 mass %.

In one example of the porous material 1, at least part of the Y component 5 contained in the binding material 3 exists as an $Y_2Si_2O_7$ crystalline phase. The $Y_2Si_2O_7$ phase is generated by a firing process and oxidation treatment, which will be described later, in the production of the porous material 1. The ratio of the mass of $Y_2Si_2O_7$ is preferably greater than or equal to 0.1 mass % of the whole porous material 1, and more preferably greater than or equal to 0.5 mass %. The ratio of the mass of $Y_2Si_2O_7$ is, for example, less than or equal to 10.0 mass %. The binding material 3 does not necessarily have to contain the $Y_2Si_2O_7$ phase, and the Y component 5 may be solid-dissolved in other crystalline phases of the binding material 3. As a matter of course, the Y component 5 may be contained in a plurality of types of crystalline phases, or may be contained in an amorphous phase.

In a preferable example of the porous material 1, the binding material 3 contains 50 mass % or more of cordierite with respect to the mass of the whole binding material 3, i.e., the binding material 3 is composed primarily of cordierite. The upper-limit value for the ratio of the mass of cordierite in the whole binding material 3 is, for example, 90 mass %. The ratio of the mass of the amorphous component in the binding material 3 is preferably less than 50 mass %. In the porous material 1, the binding material 3 may contain components other than the Y component 5, aluminum oxide ($Al_2O_3$), silicon dioxide ($SiO_2$), and magnesium oxide (MgO).

In the porous material 1 according to the present embodiment, typically, the aggregate 2 and the binding material 3 have the above-described microstructure by including the Y component 5 in the binding material 3 as described above, and this increases the strength of the porous material 1 as a whole. The bending strength is at least 5.5 MPa or more. Thus, when the porous material 1 is used to produce other products such as catalyst carriers, the products will have adequate strength in practice. Note that the bending strength can be measured and evaluated by, for example, preparing specimens with dimensions of 0.3 mm×4 mm×20 to 40 mm and conducting, for example, a three-point bending test compliant with JIS R1601 on the specimens.

The thermal expansion coefficient of the porous material 1 is reduced by including the Y component 5 in the binding material 3. In a preferable example of the porous material 1, the thermal expansion coefficient at 200° C. with respect to 40° C. (hereinafter, referred to as a "thermal expansion coefficient in a temperature range of 40 to 200° C.") is less than or equal to 5.5 ppm/K (i.e., $5.5 \times 10^{-6}$/K). In a more preferable example of the porous material 1, the thermal expansion coefficient is less than or equal to 5.0 ppm/K. As will be described later, the thermal expansion coefficient of $Y_2Si_2O_7$ is less than the thermal expansion coefficient of $Y_2O_3$, and therefore the porous material 1 containing $Y_2Si_2O_7$ has a low thermal expansion coefficient. The thermal expansion coefficient is preferably as low as possible, and the lower-limit value for the thermal expansion coefficient is, for example, 1.0 ppm/K. The thermal expansion coefficient is, for example, a value obtained by cutting a specimen with dimensions of 3 cells high, 3 cells wide, and 20 mm long from a honeycomb structure and measuring the thermal expansion coefficient of the specimen in the direction of A-axis (direction parallel to the flow path of the honeycomb structure) in the temperature range of 40 to 200° C. by a method compliant with JIS R 1618. In the case of supporting an SCR catalyst such as zeolite, the honeycomb structure is heated to around 200° C. during the process of drying slurry that contains the catalyst. The honeycomb structure (porous material 1) having a low thermal expansion coefficient in the temperature range of 40 to 200° C. has high thermal shock resistance and accordingly the SCR catalyst supporting process can be performed properly.

The lower-limit value for the average pore diameter of the porous material 1 according to the present invention is preferably 10 μm, and more preferably 15 μm. The upper-limit value for the average pore diameter is preferably 40 μm, and more preferably 30 μm. If the average pore diameter is less than 10 μm, pressure loss may increase. If the average pore diameter exceeds 40 μm, for example when the porous material according to the present invention is used as a filter such as a DPF, part of particulate matter in exhaust gases may pass through the filter without being collected. In the specification, the average pore diameter is a value measured by mercury porosimetry (compliant with JIS R 1655).

In the porous material 1 according to the present invention, the ratio of pores with pore diameters less than 10 μm is preferably less than or equal to 20% of all pores, and the ratio of pores with pore diameters greater than 40 μm is preferably less than or equal to 10% of all pores. If the ratio of pores with pore diameters less than 10 μm exceeds 20% of all pores, pressure loss may easily increase because the pores with pore diameters less than 10 μm easily get clogged when a catalyst is supported. If the ratio of pores with pore diameters greater than 40 μm exceeds 10% of all pores, it may become difficult for, for example, a DPF, to adequately perform a filtering function because the pores with pores diameters greater than 40 μm easily pass particulate matter therethrough.

In the case of preparing a honeycomb-shaped honeycomb structure (not shown) using the porous material 1, the honeycomb structure is desirably configured to have a strength (honeycomb bending strength) of at least 4.0 MPa or more. In this case, products such as catalyst carriers and DPFs can be constructed using the honeycomb structure with adequate strength and can withstand use under harsh usage environments, such as under high dynamic loads. It is also possible to satisfy demand to increase the size of honeycomb structures.

As described previously, the aggregate 2 of the porous material 1 according to the present embodiment include particle bodies 21. The particle bodies 21 are typically composed of one kind of substance. The particle bodies 21 are, for example, silicon carbide (SiC) particles. The substance composing the particle bodies 21 is preferably a non-oxide material, and may, for example, be silicon nitride ($Si_3N_4$), aluminum nitride (AlN), titanium carbide (TiC), or titanium nitride (TiN), instead of silicon carbide. For example, the particle bodies 21 of the aggregate 2 are particles of the most abundant substance among substances that compose the porous material 1.

The aggregate 2 further include the oxide films 22 provided on (or may be regarded as "around") surfaces of the particle bodies 21. Preferably, each of the aggregate 2 is composed of a particle body 21 and an oxide film 22. The oxide films as used herein refer to oxide layers formed on the surfaces of the particle bodies 21 through heat treatment in an oxidizing atmosphere when a non-oxide material is used for the particle bodies 21. When the particle bodies 21 of the aggregate 2 are SiC or $Si_3N_4$ particles, the above oxide films 22 are formed of $SiO_2$. The presence of the oxide films 22 on the surfaces of the particle bodies 21 helps increase the oxidation resistance of the porous material 1. For example, excellent oxidation resistance can be obtained when the porous material 1 is used as a catalyst carrier for purifying vehicle emission.

The oxide films 22 preferably contain a cristobalite phase. The ratio of the mass of cristobalite is, for example, in the range of 3.0 to 25.0 mass % of the whole porous material 1, preferably in the range of 5.0 to 22.0 mass %, and more preferably in the range of 7.0 to 20.0 mass %. If the ratio of the mass of cristobalite is less than 3.0 mass % of the whole porous material 1, the thickness of the oxide film layers on the surfaces of the aggregate decreases, and oxidation resistance deteriorates at high temperatures. If the ratio of the mass of cristobalite is greater than 25.0 mass %, the thermal expansion coefficient increases, and the thermal shock resistance decreases. The ratio of the mass of cristobalite to the mass of the aggregate 2 is, for example, in the range of 5.0 to 35.0 mass %, and preferably in the range of 8.0 to 30.0 mass %. Cristobalite contains an α phase as a low temprature phase and a β phase as a high temperature phase. A value (α phase/(β phase) obtained by dividing the ratio of the mass of the α phase by the ratio of the mass of the β phase is preferably greater than or equal to 2.0 (e.g., less than or equal to 4.0). The ratio of the mass of the α phase in cristobalite as a whole is preferably greater than or equal to 65.0 mass % (e.g., less than or equal to 80.0). Since the phase transition of cristobalite from the α phase to the β phase occurs in a temperature range of 150 to 350° C., the porous material including the oxide films in the aggregate tends to have a high thermal expansion coefficient. However, in the porous material 1 according to the present embodiment, the thermal expansion coefficient is reduced by including the Y component 5 in the binding material 3

The following description takes the example of the case where the porous material 1 and the honeycomb structure (not shown) formed of the porous material 1 according to the present embodiment primarily use SiC particles as the particle bodies 21 of the aggregate 2. Even if the particle bodies 21 of the aggregate 2 are composed of other particles such as $Si_3N_4$ particles, various conditions of the porous material 1 and the honeycomb structure can be made the same conditions.

The porous material 1 used for the honeycomb structure is required to have high porosity (here, open porosity). In order for the porous material 1 to easily achieve high porosity, the average particle diameter of the aggregate 2 is preferably greater than or equal to 5 μm, and more preferably greater than or equal to 10 μm. In order to avoid the presence of many excessively large pores 4 in the porous material 1, the average particle diameter of the aggregate 2 is preferably less than or equal to 100 μm, and more preferably less than or equal to 40 μm. The average particle diameter can be measured by a laser diffraction method (the same applies hereinafter).

Besides, in the porous material according to the present embodiment, the ratio of the total mass of alkali metal components in terms of oxides is set to be less than 0.1 mass % (greater than or equal to 0 mass %) of the whole porous material 1, the alkali metal components including sodium (Na) and potassium (K) contained in the fired porous material 1. The alkali metal components such as sodium or potassium exists in trace amounts within an aggregate raw material for use in forming the aggregate 2 and a raw material of binding material for use in forming the binding material 3.

The alkali metal components such as sodium are generally known to become a cause of deterioration in the long-term durability of porous materials. Thus, attempts are being made to reduce the amount of the alkali metal components contained in the porous material as much as possible. In view of this, in the porous material 1 according to the present embodiment, the ratio of the (total) mass of the alkali metal components such as sodium contained in the fired porous material 1 is set in the aforementioned range. This composition increases the long-term durability of the porous material 1.

It is also known that if the porous material (honeycomb structure) contains alkali metal components when an SCR catalyst such as zeolite is supported and used in the porous material, NOx purification performance deteriorates due to aging (heat treatment) at high temperature. However, the deterioration in NOx purification performance due to aging can be suppressed if the ratio of the mass of the alkali metal components is less than 0.1 mass %.

If the Y component 5 is not contained in the binding material 3 when the ratio of the mass of the alkali metal components is set to be less than 0.1 mass %, the aforementioned three-phase interfaces are not smoothly bound as in the case of the previously described porous material 10 according to the comparative example, and the strength of the porous material decreases. In contrast, the porous material 1 according to the present embodiment can ensure high strength by including the Y component 5 in the binding material 3 when the ratio of the mass of the alkali metal components is set to be less than 0.1 mass %. As will be described later, the same applies to the case where the binding material 3 contains a rare-earth component, excluding Ce, other than the Y component 5.

As described previously, in one example of the porous material 1, $Y_2Si_2O_7$ is generated by firing, but if the ratio of the mass of the alkali metal components is set to be greater than or equal to 0.1 mass %, the alkali metal components can easily form an amorphous phase with the components of the binding material including the Y component, and the Y component is also easily included in the amorphous phase. When the ratio of the mass of the alkali metal components is set to be less than 0.1 mass %, an amorphous phase cannot be formed easily, and this suppresses the inclusion of the Y component of the binding material in the amorphous phase. As a result, a crystalline phase of $Y_2Si_2O_7$ is easily formed. The same applies to the case of generating other rare-earth silicate, which will be described later.

It is generally known here that the bending strength of the porous material 1 and the honeycomb bending strength of the honeycomb structure are affected by the porosity (open porosity) of the porous material 1 itself. Thus, in the porous material 1 and the honeycomb structure formed of the porous material 1, the lower-limit value for the open porosity is preferably 40%. This lower-limit value is more preferably 50%, and yet more preferably 55%. On the other hand, the upper-limit value for the open porosity is preferably 90%, and more preferably 70%. If the open porosity is less than 40%, pressure loss increases, and this increase greatly affects product performance when the porous material 1 and the honeycomb structure are used as products such as DPFs. On the other hand, when the open porosity is higher than or equal to 50%, the porous material 1 and the honeycomb structure can have properties of low pressure loss and are, in particular, suitable for use as products such as DPFs.

If the open porosity exceeds 90%, the strength of the porous material 1 decreases, and the porous material 1 and the honeycomb structure cannot ensure adequate strength in practice when used as products such as DPFs. On the other hand, the porous material 1 and the honeycomb structure with an open porosity of 70% or less are, in particular, suitable for use as products such as DPFs. The details of the method for calculating the open porosity will be described later.

In the porous material 1 according to the present embodiment, the Y component 5 contained in the binding material 3 may be another rare-earth component excluding cerium (Ce). That is, the binding material 3 may contain another rare-earth component, instead of the Y component. Even in this case, it is possible to obtain the above-described microstructure and to increase the mechanical strength of the porous material 1. In the following description, the rare-earth component excluding Ce is simply referred to as a "rare-earth component." The rare-earth component is not limited to a single component, and may be a combination of two or more components at a predetermined mixture ratio. The rare-earth component is a group of at least one kind of rare-earth elements excluding Ce. The ratio of the mass (the ratio to the total mass) of the rare-earth component in terms of oxides is preferably in the range of 0.1 to 15.0 mass % of the whole porous material 1 in cases including not only cases where the rare-earth component is composed of a single kind of rare-earth elements, but also cases where the rare-earth component is composed of a group of a plurality of kinds of rare-earth elements. For example, the rare-earth component includes at least one kind selected from the group consisting of yttrium (Y), ytterbium (Yb), erbium (Er), and holmium (Ho). Oxides of Y, Yb, Er, and Ho are respectively $Y_2O_3$, $Yb_2O_3$, $Er_2O_3$, and $Ho_2O_3$. The rare-earth component may also be lanthanum (La), praseodymium (Pr), neodymium (Nd), samarium (Sm), europium (Eu), gadolinium (Gd), terbium (Tb), dysprosium (Dy), thulium (Tm), or lutetium (Lu), in which cases oxides of these components are respectively $La_2O_3$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Tm_2O_3$, and $Lu_2O_3$. The above description of the Y component 5 also applies to the case of adopting another rare-earth component.

Here, the thermal expansion coefficients of rare-earth oxides such as $Y_2O_3$ are, for example, in the range of 7 to 10 ppm/K, whereas the thermal expansion coefficients of rare-earth silicate (silicate) such as $Y_7Si_2O_7$ are, for example, in the range of 3 to 4 ppm/K and lower than the thermal expansion coefficients of the above oxides. Thus, when the rare-earth elements and the Si component in the binding material 3 react with each other and form rare-earth silicate, the thermal expansion coefficient of the porous material 1 as a whole further decreases. Examples of such rare-earth silicate include $Yb_2Si_2O_7$, $Er_2Si_2O_7$, and $Ho_2Si_2O_7$, in addition to $Y_2Si_2O_7$. In this way, in order to reduce the thermal expansion coefficient of the porous material 1, it is preferable for at least part of the rare-earth component contained in the binding material 3 to exist as $A_2Si_2O_7$ (A: Y, Yb, Er, or Ho).

In the porous material 1, the oxide films 22 may contain the rare-earth component (excluding Ce). In this case, it is also possible to reduce the thermal expansion coefficient while increasing the oxidation resistance of the porous material 1. More specifically, the rare-earth component is distributed in part of the oxide films 22, e.g., among crystals of the oxide films 22. In this case, typically, the rare-earth component involves $SiO_2$ that is an oxide film component and a binding material component, and exists as an amorphous phase in the oxide films 22. In other words, part of cristobalite in the oxide films 22 is replaced by an amorphous substance containing the rare-earth component.

Here, a sudden volume change accompanied by the phase transition occurs in cristobalite in a temperature range of 150 to 350° C. By substituting part of cristobalite in the oxide films 22 with the amorphous substance containing the rare-earth component as described above, it is possible to suppress an increase in thermal expansion coefficient due to the above volume change in cristobalite. That is, the reduction in the amount of cristobalite can reduce the thermal expansion coefficient and increase the thermal shock resistance. Additionally, the oxidation resistance of the porous material 1 is also ensured by the remaining cristobalite and the aforementioned amorphous substance containing a rare-earth oxide. Moreover, in the porous material 1, the rare-earth component may be solid-dissolved in the crystal structure of cristobalite. In this case, the crystal structure of cristobalite can be stabilized, and the aforementioned volume change accompanied by the phase transition can be suppressed. As a result, it is possible to suppress an increase in thermal expansion coefficient. As described above, when the oxide films 22 contain the rare-earth component, the thermal expansion coefficient can be reduced, irrespective of the presence or absence of rare-earth silicate ($A_2Si_2O_7$) described above. As a matter of course, when the oxide films 22 contain the rare-earth component, the binding material 3 may also contain the rare-earth component, and rare-earth silicate may exist.

Even in the case where the oxide films 22 contain the rare-earth component (excluding Ce), the ratio of the mass (the ratio of the total mass) of the rare-earth component in terms of oxides is preferably in the range of 0.1 to 15.0 mass % of the whole porous material 1. The rare-earth component contained in the oxide films 22 includes, for example, at least one kind selected from the group consisting of dysprosium (Dy), lanthanum (La), neodymium (Nd), and gadolinium (Gd). Oxides of Dy, La, Nd, and Gd are respectively $Dy_2O_3$, $La_2O_3$, $Nd_2O_3$, and $Gd_2O_3$.

(2) Honeycomb Structure

The honeycomb structure (not shown) according to the present invention is constituted using the aforementioned porous material 1 according to the present embodiment. The honeycomb structure includes partition walls that partition off and form a "plurality of cells extending from one end surface to the other end surface." That is, the honeycomb structure is a tubular member having an interior partitioned into a plurality of cells by the partition walls. The cells function as fluid paths. The features of the honeycomb structure, such as composition and shape, are already known, and honeycomb structures of any given composition and size can be constructed using the porous material 1 according to the present embodiment. For example, the honeycomb structure may be structured to have an outer wall on the outer perimeter. The lower-limit value for the thickness of the partition walls is, for example, preferably 30 μm, and more preferably 50 μm. The upper-limit value for the thickness of the partition walls is preferably 1000 μm, more preferably 500 μm, and especially preferably 350 μm. The lower-limit value for the density of cells is preferably 10 cells/cm$^2$, more preferably 20 cells/cm$^2$, and especially preferably 50 cells/cm$^2$. The upper-limit value for the density of cells is preferably 200 cells/cm$^2$, and more preferably 150 cells/cm$^2$.

There are no particular limitations on the shape of the honeycomb structure, and examples of the shape include columnar shapes as well known in the art and prism shapes having a polygonal (e.g., triangular, quadrangular, pentagonal, or hexagonal) bottom surface. In addition, there are no particular limitations on the shape of the cells of the honeycomb structure. Examples of the shape of the cells in a cross-section orthogonal to the direction of extension of the cells (axial direction) include polygonal shapes (e.g., triangular, quadrangular, pentagonal, hexagonal, heptagonal or octagonal shape), circular shapes, and a combination of these shapes.

Additionally, the dimensions of the honeycomb structure can be appropriately determined according to the application. The honeycomb structure according to the present embodiment is constituted by using the high-strength porous material 1 according to the present embodiment and therefore, in particular, has high resistance to dynamic loads. Thus, it is possible to constitute large-sized honeycomb structures for constructing large-sized DPFs or the like. For example, honeycomb structures having volumes of approximately 10 cm$^3$ to 2.0×10$^4$ cm$^3$ are conceivable.

As described previously, the honeycomb structure according to present embodiment can be used as a DPF or a catalyst carrier. In another preferable embodiment, a catalyst may be supported on the DPF. When the honeycomb structure according to the present embodiment is used as, for example, a DPF, the structure is preferably as follows. Specifically, it is preferable for the honeycomb structure to include plugging parts that are provided in the openings of predetermined cells at one end surface and in the openings of the remaining cells at the other end surface. It is preferable that, at each end surface, cells with plugging parts and cells with no plugging parts are alternately arranged, forming a checkered pattern.

(3) Method for Manufacturing Porous Material (Honeycomb Structure)

Figure 6:
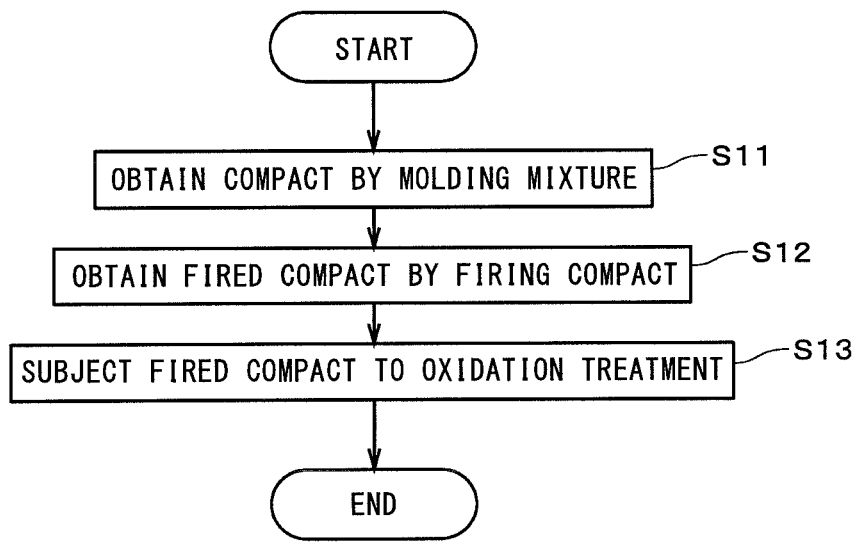
FIG. 6 is a flowchart of processing for producing a porous material.

The method of producing a porous material according to the present invention will now be described hereinafter. FIG. 6 is a flowchart of processing for producing the porous material 1. The method of producing a porous material described below is also a method of producing a honeycomb-shaped honeycomb structure composed of a porous material.

First, powdered silicon carbide that is a raw material for the aggregate 2 and a powdered raw material of binding material for use in generating the binding material 3 by firing are mixed, and other components such as a binder, a surface-active agent, a pore forming material, and water are further added as necessary to prepare a molding raw material (molding-raw-material preparation process). Preferably, raw materials that contain few alkali metal components as impurities are used. At this time, powdered yttrium oxide ($Y_2O_3$) or the like that is contained with a prescribed content in the water to be added is added (contained) as a raw material for the rare-earth component (in the present example, Y component 5) to the molding raw material. The method for adding the rare-earth component is not intended to be limited to the technique described above, and the rare-earth component may be directly charged in a powdered state into silicon carbide or the raw material of binding material in the same manner as the other components such as the binder. To be precise, the (raw material for the) rare-earth component are also part of the raw material of binding material. The rare-earth component to be added may be rare-earth oxides or rare-earth salts such as rare-earth carbonate, rare-earth nitrate, or rare-earth oxalate. As another alternative, rare-earth silicate may be added.

The raw material of binding material contains an aluminum oxide ($Al_2O_3$) component, a silicon dioxide ($SiO_2$) component, and a magnesium oxide (MgO) component. "Cordierite" as a major component of the binding material 3 is produced by firing the above raw material of binding material. Various components are usable as a cordierite raw material for use in generating a cordierite crystal by firing. Assuming that the total mass of the aggregate raw material and the raw material of binding material (i.e., total mass of inorganic raw materials) in the molding raw material is 100 mass %, the ratio of the mass of the raw material of binding material is, for example, in the range of 8.0 to 40.0 mass %. The ratio of the mass of the rare-earth component in terms of oxides to this total mass is, for example, in the range of 0.1 to 15.0 mass %.

Examples of the binder include well-known organic binders such as methylcellulose, hydroxypropoxyl cellulose, hydroxyethylcellulose, carboxymethyl cellulose, and polyvinyl alcohol. In particular, it is preferable to use both methylcellulose and hydroxypropoxyl cellulose. For example, the binder content in the whole molding raw material is preferably in the range of 2 to 10 mass %.

Examples of the surface-active agent include ethylene glycol, dextrin, fatty acid soap, and polyalcohol. Among these examples, only one kind may be used singularly, or two or more kinds may be used in combination. For example, the content of the surface-active agent in the whole molding raw material is preferably less than or equal to 2 mass %.

There are no particular limitations on the .pore forming material, as long as the pore forming material forms pores after firing, and examples of the pore forming material include graphite, starch, a foam resin, a water-absorbing resin, and silica gel. For example, the content of the pore forming material in the whole molding raw material is preferably less than or equal to 40 mass %. The lower-limit value for the average particle diameter of the pore forming material is preferably 10 μm, and in particular, the upper-limit value for the average particle diameter of the pore forming material is preferably 30 μm. If the average particle diameter of the pore forming material is less than 10 μm, holes (pores 4) may not be formed adequately in the porous material 1. On the other hand, if the average particle diameter of the pore forming material is greater than 30 μm, the molding raw material (raw mixture) may get clogged in a mouthpiece used in extrusion molding. The aforementioned average particle diameter of the pore forming material can be measured by a laser diffraction method or other methods. When a water-absorbing resin is used as the pore forming material, the average particle diameter is a value obtained by measuring the water-absorbing resin after water absorption.

The water to be added to the molding raw material can be appropriately adjusted so as to obtain hardness of a raw mixture that can be easily molded during, for example, extrusion molding. For example, it is preferable to add 20 to 80 mass % of water with respect to the mass of the whole molding raw material.

Next, the aforementioned molding raw material obtained by charging each component in a predefined amount is kneaded into the raw mixture. At this time, a device such as a kneader or a vacuum clay kneader may be used to form the raw mixture.

Thereafter, the kneaded raw mixture is subjected to extrusion molding to form a honeycomb compact (compact forming process). The extrusion molding of the raw mixture mainly uses an extruder equipped with a mouthpiece having desired properties such as overall shape, cell shape, partition wall thickness, and cell density. The material for the mouthpiece is preferably hard metal that is hard to wear. The honeycomb compact has a structure that includes porous partition walls and an outer wall, the porous partition walls portioning off and forming a plurality of cells that serve as fluid paths, and the outer wall being located on the outermost perimeter. The properties of the honeycomb compact such as the thickness of the partition walls, the density of cells, and the thickness of the outer wall may be appropriately determined in consideration of shrinkage during drying and firing and in accordance with the composition of the honeycomb structure to be prepared. As described above, the compact is obtained by molding the mixture of the aggregate raw material, the raw material of binding material, and the pore forming material (step S11).

The honeycomb compact obtained as described above is preferably dried before a firing process (dry process). There are no particular limitations on the method of drying, and examples of the method include electromagnetic-wave heating methods such as drying by microwave heating and drying by high-frequency dielectric heating, and external heating methods such as hot air drying and superheated steam drying. The electromagnetic-wave heating methods and the external heating methods may be used in combination. For example, in order to rapidly and uniformly dry the whole compact while preventing the occurrence of cracking, two-step drying may be conducted, in which first an electromagnetic-wave heating method is used to dry a certain amount of moisture, and then an external heating method is used to dry the remaining moisture. In this case, as drying conditions, it is preferable to first use the electromagnetic-wave heating method to remove 30 to 99 mass % of moisture with respect to the amount of moisture before drying, and then use the external heating method to further reduce moisture to 3 mass % or less. A preferable electromagnetic-wave heating method is drying by dielectric heating, and a preferable external heating method is hot air drying.

If the dried honeycomb compact does not have a desired length (honeycomb length) in the direction of extension of the cells (axial direction) in the honeycomb compact, the honeycomb compact may be cut to a desired length by cutting both end surfaces (both ends) of the honeycomb compact (curing process). There are no particular limitations on the method of cutting, and one example of the method is using a well-known circular saw cutter.

Then, the honeycomb compact is fired so as to obtain a fired compact (step S12). Here, calcination is preferably conducted before firing in order to remove the binder or other components (calcination process). Calcination is preferably conducted at a temperature of 200 to 600° C. for 0.5 to 20 hours in the ambient atmosphere (degreasing process). Firing is preferably conducted in an inert atmosphere such as nitrogen or argon (e.g., in a non-oxidizing atmosphere with an oxygen partial pressure of $10^{-4}$ atm or less) (firing process). The lower-limit value for the firing temperature is preferably 1300° C., and more preferably 1350° C. The upper-limit value for the firing temperature is preferably 1600° C., and more preferably 1500° C. The pressure during firing is preferably atmospheric pressure. The lower-limit value for the firing time is preferably one hour. The upper-limit value for the firing time is preferably 20 hours.

After the firing process, the fired compact is subjected to heat treatment (oxidation treatment) in an oxidizing atmosphere so as to obtain a porous material that is a honeycomb structure (step S13). The oxidizing atmosphere is, for example, the ambient atmosphere (which may contain water vapor). As described previously, in the this example of production, the aggregate raw material, contains SiC particles as a non-oxide material, and oxide films are formed on SiC surfaces exposed to the pores by oxidation treatment. Thus, the porous material can have excellent oxidation resistance when used as a catalyst carrier such as a DPF for purifying vehicle emission. In some cases, the oxide films may be formed on portions of the SiC surfaces that are covered with the binding material. The lower-limit value for the temperature of the oxidation treatment is preferably 1150° C., and more preferably 1200° C. The upper-limit value for the temperature of the oxidation treatment is preferably 1350° C., and more preferably 1300° C. By changing the temperature of the oxidation treatment, it is possible to adjust the ratio of the mass of cristobalite constituting the oxide films. The lower-limit value for the oxidation treatment time is preferably one hour. The upper-limit value for the oxidation treatment time is preferably 20 hours. The calcination, firing, and oxidation treatment may be conducted using, for example, an electric furnace or a gas furnace.

Next, examples will be described. Here, porous materials (honeycomb structures) were prepared as Examples 1 to 6 and Comparative Examples 1 to 3 under the conditions shown in Table 1.

TABLE 1

| | Inorganic Raw Material/mass % | | | | | | | | Firing Conditions | | |
|---|---|---|---|---|---|---|---|---|---|---|---|
| | SiC | Talc | Al2O3 | SiO2 | Y2O3 | CeO2 | SrCO3 | Total | Firing Temperature/° C. | Firing Atmosphere | Oxidation Temperature/° C. |
| Example 1 | 77.9 | 7.6 | 9.5 | 3.8 | 0.5 | 0.7 | 0.0 | 100 | 1450 | Ar | 1270 |
| Example 2 | 77.5 | 7.6 | 9.4 | 3.8 | 1.0 | 0.7 | 0.0 | 100 | 1430 | Ar | |
| Example 3 | 76.8 | 7.5 | 9.3 | 3.8 | 1.9 | 0.7 | 0.0 | 100 | 1430 | Ar | |
| Example 4 | 77.5 | 7.6 | 9.4 | 3.8 | 1.0 | 0.7 | 0.0 | 100 | 1430 | Ar | 1230 |
| Example 5 | 76.8 | 7.5 | 9.3 | 3.8 | 1.9 | 0.7 | 0.0 | 100 | 1430 | Ar | |
| Example 6 | 77.3 | 7.6 | 9.4 | 3.8 | 1.9 | 0.0 | 0.0 | 100 | 1450 | Ar | 1250 |
| Comparative Example 1 | 78.3 | 7.7 | 9.5 | 3.8 | 0.0 | 0.7 | 0.0 | 100 | 1400 | Ar | |
| Comparative Example 2 | 76.8 | 7.5 | 9.3 | 3.8 | 0.0 | 0.7 | 1.9 | 100 | 1400 | Ar | |
| Comparative Example 3 | 78.0 | 7.7 | 9.5 | 3.8 | 0.0 | 0.0 | 1.0 | 100 | 1400 | Ar | |

EXAMPLES 1 TO 6 AND COMPARATIVE EXAMPLES 1 TO 3

First, "base powder" was prepared by mixing powdered silicon carbide (SiC) as an aggregate raw material and a powdered raw material of binding material. The ratio of the mass of the aggregate raw material in the base powder and the ratio of the mass of the raw material of binding material in the base powder are as shown in "Inorganic Raw Material" in Table 1. Note that "SiC" in "Inorganic Raw Materials" is the aggregate raw material, and the remains are the raw materials of binding material. Each ratio shows the ratio of the mass to the mass of the whole base powder.

Moreover, a water-absorbing resin and starch that serve as the pore forming material, hydroxypropyl methylcellulose that serves as the binder, and water were added to the above prepared base powder to obtained a "molding raw material." Assuming that the mass of the base powder is 100 mass %, 5.0 mass % of the water-absorbing resin, 28 mass % of starch, and 7.0 mass % of hydroxypropyl methylcellulose were added. Thereafter, the mixture was kneaded by a kneader into a plastic raw mixture (molding raw material).

Then, the obtained raw mixture (molding raw material) was molded into a cylindrical shape (cylinder shape) by a vacuum clay kneader, and the obtained cylindrical raw mixture was charged into an extruder so as to obtain a honeycomb-shaped honeycomb compact by extrusion molding. The obtained honeycomb compact was dried in two steps, i.e., first dried with microwaves and then dried at 80° C. for 12 hours with a hot-air drier, so as to obtain a honeycomb dried compact that was not fired.

After the obtained honeycomb dried compact was cut to a desired length (honeycomb length) by cutting its both ends, the honeycomb dried compact was subjected to degreasing treatment in which the compact was degreased at a heating temperature of 450° C. in the ambient atmosphere (calcination process); fired at a firing temperature of 1400° C. to 1450° C. in an inert gas atmosphere (argon gas atmosphere); and then subjected to oxidation treatment at a temperature of 1230° C. to 1270° C. in the air (see Table 1). As a result, the porous materials with honeycomb structures (simply, "honeycomb structures") of Examples 1 to 6 and Comparative Examples 1 to 3 were obtained.

In Examples 1 to 3, yttrium oxide ($Y_2O_3$) was added as the rare-earth component excluding cerium (Ce), and the addition amount of $Y2O_3$ was changed. Cerium dioxide ($CeO_2$) was also added. Examples 4 and 5 differ only in the temperature of the oxidation treatment from Examples 2 and 3. In Example 6, only $Y_2O_3$ was added without adding $CeO_2$. In Comparative Example 1, $CeO_2$ was added, and raw materials having high sodium (Na) contents were used. In Comparative Example 2, $CeO_2$ was added, and strontium carbonate ($SrCO_3$) was further added. In Comparative Example 3, only $SrCO_3$ was added. In Comparative Examples 1 to 3, the rare-earth component excluding Ce was not added.

Various Measurements of Porous Materials

The ratio of the mass of each component (SiC, $SiO_2$, MgO, $Al_2O_3$, $CeO_2$, $Y_2O_3$, SrO, $Na_2O$, and $Fe_2O_3$) was determined by inductively coupled plasma (ICP) emission spectroscopy for the prepared porous materials. Table 2 shows the determination results for the porous materials of Examples 1 to 6 and Comparative Examples 1 to 3. Here, only C was determined quantitatively using a method compliant with JIS Z 2615 (quantitative determination of carbon in metallic materials) and JIS Z 2616 (quantitative determination of sulfur in metallic materials), i.e., by combustion-infrared absorption method in an oxygen flow. The ratio of the mass of SiC was calculated assuming that the all C was derived from SiC as the particle bodies of the aggregate, and the ratio of the mass of $SiO_2$ contained in the whole porous material was obtained assuming that the remaining Si component, which was obtained by removing SiC from Si determined by ICP emission spectroscopy, was derived from $SiO_2$. In the porous materials of Examples 1 to 6 and the porous materials of Comparative Examples 2 and 3, the ratio of the mass of $Na_2O$, i.e., the ratio of the mass of the Na component in terms of $Na_2O$, was less than 0.1 mass %. On the other hand, in the porous material of Comparative Example 1, the ratio of the mass of $Na_2O$ was greater than or equal to 0.1 mass %. Alkali metal components other than Na were not detected.

TABLE 2

| | Chemical Composition/mass % | | | | | | | | | |
|---|---|---|---|---|---|---|---|---|---|---|
| | SiC | SiO2 | MgO | Al2O3 | CeO2 | Y2O3 | SrO | Na2O | Fe2O3 | Total |
| Example 1 | 60.1 | 26.6 | 2.2 | 9.4 | 0.65 | 0.44 | 0.00 | 0.07 | 0.40 | 100 |
| Example 2 | 59.9 | 26.5 | 2.2 | 9.4 | 0.65 | 0.88 | 0.00 | 0.07 | 0.39 | 100 |
| Example 3 | 59.3 | 26.3 | 2.2 | 9.3 | 0.64 | 1.74 | 0.00 | 0.07 | 0.39 | 100 |
| Example 4 | 65.0 | 20.4 | 2.4 | 10.2 | 0.70 | 0.82 | 0.00 | 0.07 | 0.43 | 100 |
| Example 5 | 63.3 | 21.3 | 2.3 | 10.0 | 0.69 | 1.85 | 0.00 | 0.07 | 0.41 | 100 |
| Example 6 | 59.0 | 26.9 | 2.3 | 9.6 | 0.00 | 1.83 | 0.00 | 0.07 | 0.39 | 100 |
| Comparative Example 1 | 66.1 | 21.3 | 2.3 | 9.3 | 0.72 | 0.00 | 0.00 | 0.19 | 0.00 | 100 |
| Comparative Example 2 | 61.8 | 24.7 | 2.3 | 9.5 | 0.64 | 0.00 | 0.60 | 0.07 | 0.39 | 100 |
| Comparative Example 3 | 62.2 | 24.9 | 2.3 | 9.6 | 0.00 | 0.00 | 0.61 | 0.07 | 039 | 100 |

The ratio of the mass of each constituent crystalline phase of the porous material, the thermal expansion coefficient, the bending strength, the porosity, changes in NOx purification rate before and after heat treatment were further measured. Table 3 show the measurement results for the porous materials of Examples 1 to 6 and Comparative Examples 1 to 3.

tatively by analyzing the obtained X-ray diffraction data by the Rietveld method using analysis software TOPAS (manufactured by Bruker AXS). The ratio of the mass of each constituent crystalline phase was calculated, assuming that the sum of the masses of all crystalline phases that could be detected was 100 mass %.

TABLE 3

| | Constituent Crystalline Phase/mass % | | | | | | | | | | |
|---|---|---|---|---|---|---|---|---|---|---|---|
| | | Cristobalite | | | | | | | | | |
| | SiC | α | β | α + β | Cordierite | Mullite | Corundum | Y2Si2O7 | SrSi2Al2O8 | CeO2 | Total |
| Example 1 | 63.3 | 8.9 | 3.8 | 12.7 | 18.0 | 6.0 | 0.0 | 0.0 | 0.0 | 0.0 | 100 |
| Example 2 | 63.7 | 10.0 | 4.3 | 14.3 | 17.0 | 5.0 | 0.0 | 0.0 | 0.0 | 0.0 | 100 |
| Example 3 | 59.5 | 12.0 | 5.1 | 17.1 | 17.1 | 5.1 | 0.0 | 1.2 | 0.0 | 0.0 | 100 |
| Example 4 | 69.2 | 6.0 | 2.6 | 8.5 | 17.3 | 5.0 | 0.0 | 0.0 | 0.0 | 0.0 | 100 |
| Example 5 | 67.0 | 7.0 | 3.0 | 10.0 | 16.8 | 4.9 | 0.0 | 1.3 | 0.0 | 0.0 | 100 |
| Example 6 | 59.0 | 12.6 | 5.4 | 18.0 | 17.0 | 4.9 | 0.0 | 1.0 | 0.0 | 0.0 | 100 |
| Comparative Example 1 | 64.7 | 8.9 | 5.3 | 14.2 | 16.3 | 1.3 | 3.0 | 0.0 | 0.0 | 0.5 | 100 |
| Comparative Example 2 | 65.3 | 7.1 | 4.7 | 11.8 | 15.7 | 2.5 | 0.0 | 0.0 | 4.2 | 0.5 | 100 |
| Comparative Example 3 | 64.0 | 9.1 | 5.4 | 14.5 | 16.0 | 4.0 | 0.0 | 0.0 | 1.5 | 0.0 | 100 |

| | Thermal Expansion Coefficient | | Bending Strength | Porosity | Change in NOx Purification Ratio | Angle of Rise Degree |
|---|---|---|---|---|---|---|
| | 40-200° C. | 40-800° C. | MPa | % | | |
| Example 1 | 5.5E−06 | 4.5E−06 | 11.4 | 60.4 | ○ | 21.7 |
| Example 2 | 5.2E−06 | 4.2E−06 | 11.3 | 59.1 | ○ | 18.1 |
| Example 3 | 4.4E−06 | 4.0E−06 | 13.5 | 56.4 | ○ | 15.9 |
| Example 4 | 5.1E−06 | 4.2E−06 | 10.3 | 60.2 | ○ | — |
| Example 5 | 4.4E−06 | 4.0E−06 | 12.5 | 58.1 | ○ | — |
| Example 6 | 4.5E−06 | 4.3E−06 | 15.0 | 61.1 | ○ | — |
| Comparative Example 1 | 6.2E−06 | 4.6E−06 | 10.0 | 65.9 | x | 28.9 |
| Comparative Example 2 | 6.5E−06 | 4.0E−06 | 10.1 | 62.1 | ○ | — |
| Comparative Example 3 | 6.4E−06 | 4.5E−06 | 8.5 | 64.9 | ○ | — |

The ratio of the mass of each constituent crystalline phase of the porous material was obtained as follows. An X-ray diffraction pattern of the porous material was obtained using an X-ray diffractometer. As the X-ray diffractometer, a multi-functional powder X-ray diffractometer (D8 ADVANCE manufactured by Bruker corporation) was used. The conditions of the X-ray diffraction measurement were as follows: a CuKα-ray source, 10 kV, 20 mA, and 2θ=5 to 100°. Then, each crystalline phase was determined quanti- Here, it is confirmed in advance that cristobalite is not detected in porous materials that are not subjected to oxidation treatment, and therefore it can be said that cristobalite is oxide films formed on surfaces of the particle bodies of the aggregate. The presence of the oxide films helps increase the oxidation resistance of the porous material. In Examples 4 and 5 that reduced the temperature of the oxidation treatment, the ratio of the mass of cristobalite decreased. In Examples 1 to 6, a value (α phase/β phase) obtained by dividing the ratio of the mass of the α phase of cristobalite by the ratio of the mass of the β phase was greater than or equal to 2.0, or the ratio of the mass of the a phase to the mass of the whole cristobalite was greater than or equal to 65.0 mass %. Among the constituent crystalline phases, SiC and cristobalite serve as the aggregate, and the remains serve as the binding material. In the porous materials of Examples 1 to 6 and Comparative Examples 1 to 3, the binding material contained 50 mass % or more (to be more specific, 60 mass % or more) of cordierite with respect to the mass of the whole binding material.

Changes in NOx purification rate before and after the heat treatment were obtained as follows. First, the obtained porous material was pulverized in a mortar until it would pass through a No. 100-mesh sieve (with an aperture size of 150 μm). The pulverized base material and a zeolite catalyst for purifying NOx were mixed at a weight ratio of 3:1, and the mixed powder was subjected to uniaxial press-molding using a mold with a diameter of 30 mm. A pellet obtained by the molding process was then pulverized into particles of 2 to 3 millimeters and used as an evaluation sample. The sample was held at 900° C. for two hours in an oxidizing atmosphere that contains 10% of water vapor, and the evaluation sample that had undergone the heat treatment was obtained.

Such samples were evaluated using a vehicle emission analyzer (SIGU-1000 manufactured by HORIBA, Ltd.). As the conditions of the evaluation, the temperature was set in the range of 200 to 500° C.; a mixture gas containing 10% of $O_2$, 8% of $CO_2$, 5% of $H_2O$, 150 ppm of NO, and 300 ppm of $NH_3$ was introduced as a reaction gas; and the concentration of each component in the exhaust gas passing through a measurement sample was analyzed using an exhaust-gas measuring device (MEXA-6000FT manufactured by HORIBA, Ltd.) so as to evaluate a reduction ratio of the NO gas. The same test was conducted on both of the sample that had undergone the heat treatment and the sample that had not undergone the heat treatment, and a porous material whose NOx conversion ratio (purification rate) at each measurement temperature did not show changes of a predetermined value or more between the both was marked with an open circle, and a porous material whose NOx conversion ratio at any measurement temperature showed changes of the predetermined value or more between the both was marked with a letter X. Only the porous material of Comparative Example 1, in which the ratio of the mass of the alkali metal component was greater than or equal to 0.1 mass %, showed a change of the predetermined value or more in NOx conversion ratio.

The porosity (open porosity) was measured by the Archimedes method using pure water as a medium and using a plate piece obtained by cutting the porous material to dimensions of 20 mm×20 mm×0.3 mm. In the measurement of the bending strength, the porous material was processed into a specimen with dimensions of 0.3 mm high, 4 mm wide, and 40 mm long and subjected to a bending test compliant with JIS R 1601.

The porous materials of Examples 1 to 6 had a bending strength greater than or equal to 10.0 MPa and higher mechanical strength than the porous materials of Comparative Examples 1 to 3. It can be said that the porous materials with high mechanical strength of Examples 1 to 6 had excellent thermal shock resistance.

To be more specific, it can be seen from Examples 2 and 3 (the same firing temperature) and Examples 4 and 5 that the bending strength increases as the ratio of the mass of the rare-earth component excluding Ce (the ratio of the mass of Y in terms of an oxide) increases (see Table 2). In Example 1, the ratio of the mass of the rare-earth component excluding Ce was 0.44 mass %, and even in this case, high bending strength was achieved. Thus, it is conceivable that the mechanical strength of porous materials can be increased if the ratio of the mass of the rare-earth component excluding Ce in terms of an oxide is greater than or equal to 0.1 mass %. An excessively high ratio of the mass of the rare-earth component may lead to a decrease in mechanical strength, and therefore the ratio of the mass of the rare-earth component is preferably less than or equal to 15.0 mass %, which corresponds to around a half of the mass of the binding material. Comparative Examples 1 to 3 that contained the Sr component and did not contain the Y component or that had a high ratio of the mass of the Na component also achieved a certain high level of bending strength.

In the measurement of the thermal expansion coefficient, a specimen with dimensions of 3 cells high, 3 cells wide, and 20 mm long was cut from the honeycomb structure, and an average coefficient of linear thermal expansion (thermal expansion coefficient) in the direction of A-axis (direction parallel to the flow path of the honeycomb structure) in the temperature ranges of 40 to 200° C. and 40 to 800° C. was measured by a method compliant with JIS R 1618.

The porous materials of Examples 1 to 6 that contained the Y component as the rare-earth component (see Table 2) had a thermal expansion coefficient less than or equal to 5.5 ppm/K in the temperature range of 40 to 200° C., and had lower thermal expansion coefficients than those of the porous materials of Comparative Examples 1 to 3. It can be said that the porous materials of Examples 1 to 6 with high mechanical strength and low thermal expansion coefficients had excellent thermal shock resistance. The porous materials of Examples 3, 5, and 6, from which $Y_2Si_2O_7$ was detected, had thermal expansion coefficients less than or equal to 5.0 ppm/K (in practice, less than or equal to 4.5 ppm/K) in the temperature range of 40 to 200° C., and the thermal expansion coefficients were considerably reduced. In the porous materials of Examples 1, 2, and 4 with low addition amounts of $Y_2O_3$, the presence of $Y_2Si_2O_7$ was not confirmed, but the thermal expansion coefficient in the temperature range of 40 to 200° C. decreased as the addition amount of $Y_2O_3$ increased. Thus, it is conceivable that in actuality, $Y_2Si_2O_7$ was formed at a level below the limit of detection in the X-ray diffraction (XRD) analysis. On the other hand, in the porous materials of Comparative Examples 1 and 2 that contained Ce and did not contain the Y component, the Ce component existed as a $CeO_2$ phase, and in this case, their thermal expansion coefficients were higher than those of the porous materials of Examples 1 to 6. Accordingly, from the viewpoint of reducing the thermal expansion coefficient, it can be said that the ratio of the mass of the $CeO_2$ phase to the mass of the whole porous material is preferably low (e.g., less than or equal to 0.3 mass %).

In Table 3, the representative value for the angle of rise on the edge of the binding material is also shown in the column "Angle of Rise" for the porous materials of Examples 1 to 3 and Comparative Example 1. The angle of rise on the edge of the binding material was obtained by the technique described with reference to FIG. 5. Here, 10 measurement positions were specified in an image obtained by photographing a cross-sectional polished surface at a magnification of 1500 times, and an average value of the 10 angles of rise was obtained. In the porous materials of Examples 1 to 3 that contained the rare-earth component (excluding Ce) in the binding material, the representative value for the angle of rise was less than or equal to 25 degrees. On the other hand, in the porous material of Comparative Example 1, the representative value for the angle of rise was greater than 25 degrees. This is thought to be due to the fact that, although the edges of the binding material did not have rounded shapes in the porous material of Comparative Example 1, a high ratio of the mass of the Na component helped achieve a certain level of bending strength.

EXAMPLES 7 TO 16

Next, porous materials (honeycomb structures) were prepared as Examples 7 to 16 under the conditions shown in Table 4. The same method as in Examples 1 to 6 described above was used to prepare the porous materials.

TABLE 4

| | Inorganic Raw Material/mass % | | | | | | | Firing Conditions | | |
|---|---|---|---|---|---|---|---|---|---|---|
| | | | | | | | | Firing | Firing | Oxidation |
| | SiC | Talc | Al2O3 | SiO2 | Rare-Earth Oxide | CeO2 | SrCO3 | Total | Temperature/° C. | Atmosphere | Temperature/° C. |
| Example 7 | 77.9 | 7.6 | 9.5 | 3.8 | Yb2O3; 0.5 | 0.7 | 0.0 | 100 | 1430 | Ar | 1250 |
| Example 8 | 76.8 | 7.5 | 9.3 | 3.8 | Yb2O3; 2.0 | 0.7 | 0.0 | 100 | | | |
| Example 9 | 76.8 | 7.5 | 9.3 | 3.8 | Er2O3; 2.0 | 0.7 | 0.0 | 100 | | | |
| Example 10 | 76.8 | 7.5 | 9.3 | 3.8 | Ho2O3; 2.0 | 0.7 | 0.0 | 100 | | | |
| Example 11 | 77.9 | 7.6 | 9.5 | 3.8 | Dy2O3; 0.5 | 0.7 | 0.0 | 100 | | | |
| Example 12 | 77.5 | 7.6 | 9.4 | 3.8 | Dy2O3; 1.0 | 0.7 | 0.0 | 100 | | | |
| Example 13 | 76.8 | 7.5 | 9.3 | 3.8 | Dy2O3; 2.0 | 0.7 | 0.0 | 100 | | | |
| Example 14 | 76.8 | 7.5 | 9.3 | 3.8 | La2O3; 2.0 | 0.7 | 0.0 | 100 | | | |
| Example 15 | 76.8 | 7.5 | 9.3 | 3.8 | Nd2O3; 2.0 | 0.7 | 0.0 | 100 | | | |
| Example 16 | 76.8 | 7.5 | 9.3 | 3.8 | Gd2O3; 2.0 | 0.7 | 0.0 | 100 | | | |

In Examples 7 and 8, ytterbium oxide ($Yb_2O_3$) was added as the rare-earth component excluding Ce, and the addition amount of $Yb_2O_3$ was changed. In Example 9, erbium oxide ($Er_2O_3$) was added as the rare-earth component; and in Example 10, holmium oxide ($Ho_2O_3$) was added as the rare-earth component. In Examples 11 to 13, dysprosium oxide ($Dy_2O_3$) was added as the rare-earth component, and the addition amount of $Dy_2O_3$ was changed. In Example 14, lanthanum oxide ($La_2O_3$) was added as the rare-earth component; in Example 15, neodymium oxide ($Nd_2O_3$) was added as the rare-earth component; and in Example 16, gadolinium oxide ($Gd_2O_3$) was added as the rare-earth component. In Examples 7 to 16, cerium dioxide ($CeO_2$) was also added.

Various measurements of the porous materials of Examples 7 to 16 were conducted in the same manner as in Examples 1 to 6 described above. Tables 5 and 6 show the results of various measurements for Examples 7 to 16. The column "Rare-Earth Oxide" in Table 5 shows the ratio of the mass of the substance indicated by "Rare-Earth Oxide" in Table 4 for each example.

TABLE 5

| | Chemical Composition/mass % | | | | | | | | | |
|---|---|---|---|---|---|---|---|---|---|---|
| | SiC | SiO2 | MgO | Al2O3 | CeO2 | Rare-Earth Oxide | SrO | Na2O | Fe2O3 | Total |
| Example 7 | 60.0 | 26.6 | 2.2 | 9.4 | 0.79 | 0.43 | 0.00 | 0.06 | 0.40 | 100 |
| Example 8 | 58.0 | 25.7 | 2.1 | 9.1 | 2.96 | 1.70 | 0.00 | 0.07 | 0.38 | 100 |
| Example 9 | 58.2 | 25.5 | 2.0 | 9.3 | 2.90 | 1.68 | 0.00 | 0.07 | 0.38 | 100 |
| Example 10 | 57.9 | 25.8 | 2.2 | 9.1 | 2.84 | 1.71 | 0.00 | 0.06 | 0.38 | 100 |
| Example 11 | 60.2 | 26.6 | 2.1 | 9.4 | 0.75 | 0.42 | 0.00 | 0.07 | 0.40 | 100 |
| Example 12 | 59.4 | 26.3 | 2.2 | 9.3 | 1.44 | 0.87 | 0.00 | 0.07 | 0.39 | 100 |
| Example 13 | 60.3 | 26.7 | 2.2 | 9.5 | 0.73 | 0.45 | 0.00 | 0.06 | 0.40 | 100 |
| Example 14 | 60.1 | 26.6 | 2.2 | 9.5 | 0.63 | 0.44 | 0.00 | 0.07 | 0.40 | 100 |
| Example 15 | 60.4 | 26.1 | 2.5 | 9.6 | 0.66 | 0.48 | 0.00 | 0.07 | 0.41 | 100 |
| Example 16 | 60.5 | 26.5 | 2.1 | 9.4 | 0.71 | 0.43 | 0.00 | 0.06 | 0.40 | 100 |

TABLE 6

| | | Constituent Crystalline Phase/mass % | | | | | | | | | |
|---|---|---|---|---|---|---|---|---|---|---|---|
| | | Cristobalite | | | | | | | | | |
| | SiC | α | β | α + β | Cordierite | Mullite | Corundum | Y2Si2O7 | | SrSi2Al2O8 | CeO2 | Total |
| Example 7 | 64.0 | 9.0 | 4.2 | 13.2 | 16.1 | 5.9 | 0.0 | 0.0 | | 0.0 | 0.7 | 100 |
| Example 8 | 63.9 | 7.3 | 4.2 | 11.5 | 16.6 | 5.6 | 0.0 | Yb2Si2O7; 1.9 | | 0.0 | 0.6 | 100 |
| Example 9 | 66.1 | 8.5 | 3.8 | 12.3 | 14.3 | 5.7 | 0.0 | Er2Si2O7; 1.2 | | 0.0 | 0.4 | 100 |
| Example 10 | 65.0 | 9.1 | 2.9 | 12.0 | 16.4 | 5.5 | 0.0 | Ho2Si2O7; 0.8 | | 0.0 | 0.1 | 100 |
| Example 11 | 61.8 | 9.3 | 4.5 | 13.8 | 18.2 | 5.4 | 0.0 | 0.0 | | 0.0 | 0.7 | 100 |
| Example 12 | 63.2 | 9.9 | 4.2 | 14.1 | 16.7 | 5.5 | 0.0 | 0.0 | | 0.0 | 0.5 | 100 |
| Example 13 | 63.4 | 10.3 | 3.9 | 14.2 | 17.3 | 5.1 | 0.0 | 0.0 | | 0.0 | 0.0 | 100 |
| Example 14 | 64.0 | 10.5 | 4.2 | 14.7 | 16.2 | 5.1 | 0.0 | 0.0 | | 0.0 | 0.0 | 100 |
| Example 15 | 63.5 | 11.0 | 3.9 | 14.9 | 16.1 | 5.4 | 0.0 | 0.0 | | 0.0 | 0.0 | 100 |
| Example 16 | 63.7 | 10.4 | 3.5 | 13.9 | 17.0 | 5.3 | 0.0 | 0.0 | | 0.0 | 0.0 | 100 |

| | Thermal Expansion Coefficient | | Bending Strength | Porosity |
|---|---|---|---|---|
| | 40-200° C. | 40-800° C. | MPa | % |
| Example 7 | 4.4E−06 | 4.1E−06 | 11.0 | 65.2 |
| Example 8 | 4.4E−06 | 4.0E−06 | 12.4 | 64.5 |
| Example 9 | 4.9E−06 | 4.4E−06 | 10.6 | 65.5 |
| Example 10 | 4.4E−06 | 4.1E−06 | 10.2 | 64.6 |
| Example 11 | 4.5E−46 | 4.0E−06 | 10.8 | 64.1 |
| Example 12 | 4.7E−06 | 4.3E−06 | 11.2 | 63.5 |
| Example 13 | 4.1E−06 | 3.9E−06 | 13.6 | 62.3 |
| Example 14 | 4.9E−06 | 4.3E−06 | 12.8 | 62.3 |
| Example 15 | 5.5E−06 | 4.5E−06 | 12.4 | 62.9 |
| Example 16 | 4.7E−06 | 4.3E−06 | 9.8 | 64.3 |

Table 5 shows that the porous materials of Examples 7 to 16 contained 0.1 mass % or more of the rare-earth component excluding Ce in terms of oxides with respect to the mass of the whole porous material. The ratio of the mass of $Na_7O$, i.e., the ratio of the mass of the Na component in terms of $Na_2O$, was less than 0.1 mass %. Table 6 shows that the binding material in any of the porous materials contained 50 mass % or more (to be more specific, 60 mass % or more) of cordierite with respect to the mass of the whole binding material. All of the porous materials of Examples 7 to 16 achieved high bending strength (mechanical strength), and it can be said that these porous materials had excellent thermal shock resistance. It can be said from Examples 7 and 8 that the bending strength increases as the ratio of the mass of the Yb component increases.

In the porous materials of Examples 7 to 16 that respectively contained the Yb component, the Er component, the Ho component, the Dy component, the La component, the Nd component, and Gd component as the rare-earth component excluding Ce, the thermal expansion coefficients were less than or equal to 5.5 ppm/K in the temperature range of 40 to 200° C. and lower than the thermal expansion coefficients of the porous materials of Comparative Examples 1 to 3. Thus, it can be said that the porous materials of Examples 7 to 16 with high mechanical strength and low thermal expansion coefficients have more excellent thermal shock resistance.

To be more specific, rare-earth silicate ($Yb_2Si_2O_7$, $Er_2Si_2O_7$, $Ho_2Si_2O_7$) was detected from Examples 8 to 10 that respectively contained the Yb component, the Er component, and the Ho component as the rare-earth component excluding Ce. It is conceivable that the presence of rare-earth silicate with a relatively low thermal expansion coefficient helped reduce the thermal expansion coefficients of the porous materials of Example 8 to 10. It is conceivable that even in the porous material of Example 7 with a low addition amount of $Yb_2O_3$, in actuality, $Yb_2Si_2O_7$ was formed at a level below the limit of detection of the X-ray diffraction (XRD) analysis.

On the other hand, in the porous materials of Examples 11 to 16 that contained any of the Dy component, the La component, the Nd component, and the Gd component as the rare-earth component excluding Ce, a crystalline phase containing these components was not detected, and the presence of an amorphous phase in these porous materials was confirmed from the X-ray diffraction data. Additionally, each rare-earth component was detected in the oxide films around the particle bodies of the aggregate by an energy dispersive X-ray analyzer (EDS). Thus, it can be said that the porous materials of Examples 11 to 16 contained the rare-earth component as an amorphous phase in the oxide films. This is thought to be due to the fact that the thermal expansion coefficient of each porous material of Examples 11 to 16 was reduced by substituting part of cristobalite in the oxide films with an amorphous substance containing the rare-earth component described above. The remaining cristobalite and the above amorphous substance containing rare-earth oxides ensure the oxidation resistance of the porous material.

The porous material 1, the honeycomb structure, and the method of producing a porous material may be modified in various ways.

The porous material 1 may be formed in a form other than the honeycomb structure, and may be used in various applications other than filters. Depending on the application of the porous material 1, the particle bodies 21 of the aggregate 2 may contain particles of a plurality of types of substances.

The method of producing the porous material 1 and the honeycomb structure is not limited to the examples described above, and may be modified in various ways.

The configurations of the preferred embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention. This application claims priority benefit under 35 U.S.C. Section 119 of Japanese Patent Application No. 2016-208153 filed in the Japan Patent Office on Oct. 24, 2016, Japanese Patent Application No. 2017-110016 filed in the Japan Patent Office on Jun. 2, 2017, and Japanese Patent Application No. 2017-172072 filed in the Japan Patent Office on Sep. 7, 2017, the entire disclosures of which are incorporated herein by reference.

INDUSTRIAL APPLICABILITY

The porous material according to the present invention may be used as a material for, for example, catalyst carriers and DPFs. The honeycomb structure according to the present invention may be used as, for example, a catalyst carrier or a DPF. The method of producing a porous material according to the present invention may be used to produce the above-described porous material.

REFERENCE SIGNS LIST

1 Porous material
2, 2a, 2b Aggregate
3 Binding material
4 Pore
5 Y component
21 Particle body
22 Oxide film
S11 to S13 Step

The invention claimed is:
1. A porous material comprising:
an aggregate in which oxide films are formed on surfaces of particle bodies, said particle bodies including SiC particles; and
a binding material that contains cordierite and binds said aggregate together in a state where pores are formed,
wherein said porous material contains Ce,
said binding material contains a rare-earth component other than Ce, said rare-earth component including Y,
at least part of said rare-earth component exists as , $Y_2Si_2O_7$,
a ratio of a mass of said rare-earth component other than Ce in terms of an oxide is in a range of 0.44 to 1.85 mass % of said porous material as a whole,
a percentage of amorphous component in said binding material is less than 50 mass %,
a percentage of said binding material in said porous material is greater than 15.0 mass % and less than or equal to 50 mass %, and
an alkali metal component is contained in said porous material, and a ratio of a mass of said alkali metal component in terms of an oxide is less than 0.1 mass % of said porous material as a whole.
2. The porous material according to claim 1, wherein said oxide films contain cristobalite.
3. The porous material according to claim 2, wherein a ratio of a mass of said cristobalite is in a range of 3.0 to 25.0 mass % of said porous material as a whole.
4. The porous material according to claim 1, wherein said porous material contains Na or K as said alkali metal component.
5. The porous material according to claim 1, wherein a thermal expansion coefficient in a temperature range of 40° C. to 200° C is less than or equal to 5.5 ppm/K.
6. A honeycomb structure that is a tubular member made of the porous material according to claim 1 and having an interior partitioned into a plurality of cells by partition walls.
7. A method of producing a porous material, comprising:
a) obtaining a compact by molding a mixture of an aggregate raw material, a raw material of binding material, and a pore forming material;
b) obtaining a fired compact by firing said compact at a temperature of 1300 to 1600° C. in an inert atmosphere; and
c) obtaining a porous material by subjecting said fired compact to oxidation treatment at a temperature of 1150 to 1350° C. in an oxidizing atmosphere.
wherein said aggregate raw material is a non-oxide material,
said aggregate comprising oxide films formed on surfaces of the particle bodies, said particle bodies including SiC particles,
said raw material of binding material contains a rare-earth component other than Ce, said rare-earth component including Y,
said porous material comprises a binding material that contains cordierite and binds said aggregate together in a state where pores are formed,
said porous material contains Ce,
at least part of said rare-earth component exists in said binding material as $Y_2Si_2O_7$,
a ratio of a mass of said rare-earth component other than Ce in terms of an oxide is in a range of 0.44 to 1.85 mass % of said porous material as a whole,
a percentage of amorphous component in said binding material is less than 50 mass %,
a percentage of said binding material in said porous material is greater than 15.0 mass % and less than or equal to 50 mass %, and
an alkali metal component is contained in said porous material, and a ratio of a mass of said alkali metal component in terms of an oxide is less than 0.1 mass % of said porous material as a whole.

* * * * *